(12) United States Patent
Scheffer et al.

(10) Patent No.: US 11,130,036 B1
(45) Date of Patent: Sep. 28, 2021

(54) METHOD AND APPARATUS FOR ADJUSTING HYDRODYNAMIC PROPERTIES OF A WATERCRAFT

(71) Applicants: Paulette Scheffer, Kula, HI (US); Tamara Evans, Kihei, HI (US)

(72) Inventors: Paulette Scheffer, Kula, HI (US); Tamara Evans, Kihei, HI (US)

( * ) Notice: Subject to any disclaimer, the term of this patent is extended or adjusted under 35 U.S.C. 154(b) by 0 days.

(21) Appl. No.: 17/307,608

(22) Filed: May 4, 2021

(51) Int. Cl.
| | |
|---|---|
| *A63B 69/06* | (2006.01) |
| *B63B 34/26* | (2020.01) |
| *A63B 21/00* | (2006.01) |
| *A63B 21/008* | (2006.01) |
| *B63B 1/32* | (2006.01) |

(52) U.S. Cl.
CPC .......... *A63B 69/06* (2013.01); *A63B 21/0084* (2013.01); *B63B 34/26* (2020.02); *A63B 2069/068* (2013.01); *B63B 1/32* (2013.01)

(58) Field of Classification Search
CPC ................ A63B 21/0084; A63B 69/06; A63B 2069/068; B63B 34/26; B63B 1/32
See application file for complete search history.

(56) References Cited

U.S. PATENT DOCUMENTS

| | | | | |
|---|---|---|---|---|
| 5,029,849 A | * | 7/1991 | Nurkowski | A63B 21/072 482/106 |
| 7,955,236 B2 | * | 6/2011 | DiGiovanni | A63B 21/4015 482/124 |
| 2005/0065000 A1 | * | 3/2005 | Reinhart | A63B 21/4009 482/105 |
| 2006/0183609 A1 | * | 8/2006 | Flynn | A63B 21/0004 482/124 |
| 2012/0111257 A1 | * | 5/2012 | Fehily | B63B 43/14 114/271 |

OTHER PUBLICATIONS https://www.washrider.com/products/resistance-strap.

* cited by examiner

*Primary Examiner* — Lars A Olson
*Assistant Examiner* — Jovon E Hayes

(57) ABSTRACT

An apparatus for securely and removably attaching an apparatus for adjusting the hydrodynamics of a watercraft is provided. The apparatus is attached to the watercraft by an elastic cord. One or more flow resistance members are removably attached to the cord. The cord is looped in a configuration that allows for infinite length/size adjustment. A closure for forming the loop can be released, allowing the user to add or subtract resistance members to achieve a desired resistance.

4 Claims, 3 Drawing Sheets

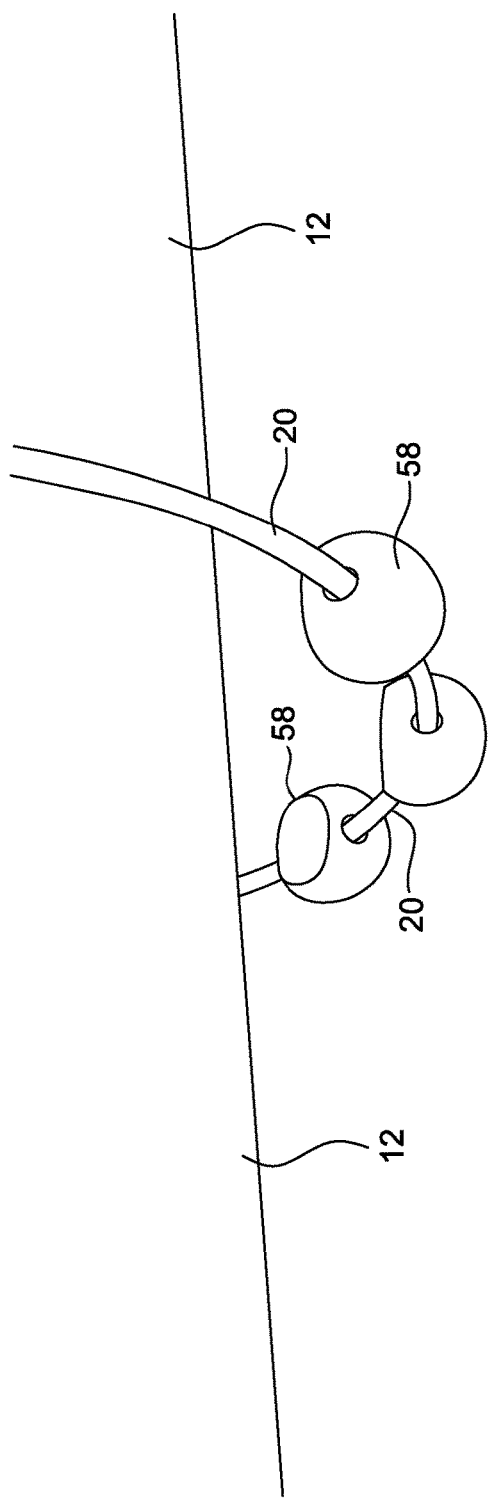
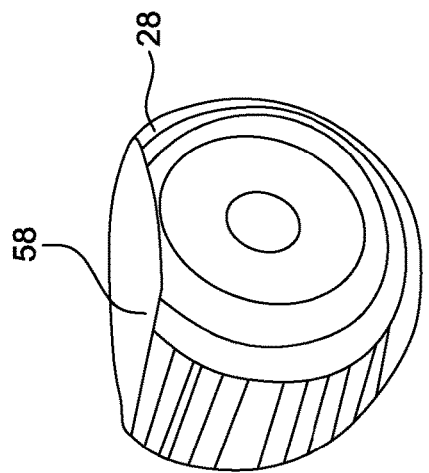
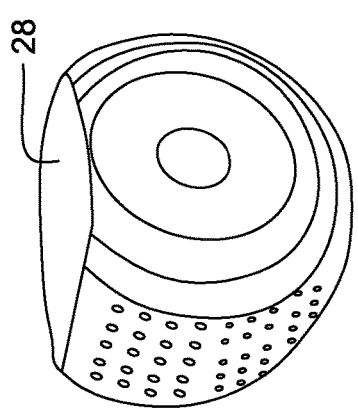
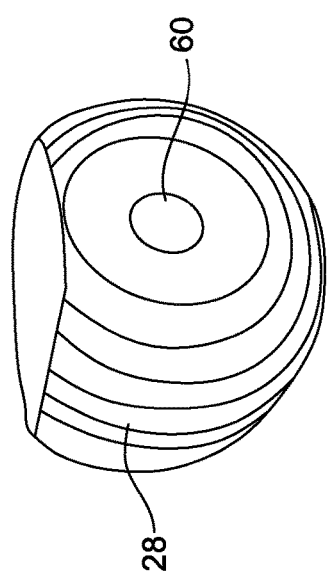
FIG. 2
FIG. 3A
FIG. 3B
FIG. 3C

METHOD AND APPARATUS FOR ADJUSTING HYDRODYNAMIC PROPERTIES OF A WATERCRAFT

1. FIELD OF THE INVENTION

The present invention generally relates to accessories for watercraft. More specifically, the present invention relates to an apparatus for attaching to watercraft to decrease hydrodynamics for resistance training.

BACKGROUND OF THE INVENTION

Watercraft have become popular in recent years. These watercraft and vehicles, such as kayaks, canoes, etc., are often purpose built and streamlined such that hydrodynamics are maximized, that is, the watercraft can move through the water with minimal resistance. While this is generally desirable, there are times when increased hydrodynamic resistance is beneficial. The increased resistance or drag forces the user to work harder to propel the watercraft through the water, this in turn leading to better rowing form and providing a more vigorous workout.

Many watercraft are made from fiberglass or other synthetic material which makes providing external hydrodynamic impeding (flow resisting) devices problematic because the interaction of the device with the hull of the ship can cause serious damage. Also, adjusting the resistance on-the-fly or adjusting for size is difficult to achieve.

An apparatus for securely and removably attaching an apparatus for adjusting the hydrodynamics of a watercraft is provided. The apparatus is attached to the watercraft by an elastic cord. One or more flow resistance members are removably attached to the cord. The cord is looped in a configuration that allows for infinite length/size adjustment. A closure for forming the loop can be released, allowing the user to add or subtract resistance members to achieve a desired resistance.

SUMMARY OF THE INVENTION

It is a major object of the invention to provide an improved apparatus for adjusting the hydrodynamic properties of a watercraft.

It is another object of the invention to provide an improved apparatus for adjusting the hydrodynamic properties of a watercraft that can be used with multiple types, sizes and styles of boats.

It is another object of the invention to provide an improved apparatus for adjusting the hydrodynamic properties of a watercraft to a watercraft that can eliminate hull damage from resistance members.

It is another object of the invention to provide an improved apparatus for adjusting the hydrodynamic properties of a watercraft with at least two methods for increasing drag.

BRIEF DESCRIPTION OF THE DRAWINGS

FIG. 2 perspective view of the apparatus of the invention positioned on a watercraft detailing the flow resistance members.

FIG. 3A is a perspective view of a first type of flow resistance member used with the apparatus.

FIG. 3B is a perspective view of a second type of flow resistance member used with the apparatus.

FIG. 3C is a perspective view of a third type of flow resistance member used with the apparatus.

DETAILED DESCRIPTION

Figure 1:
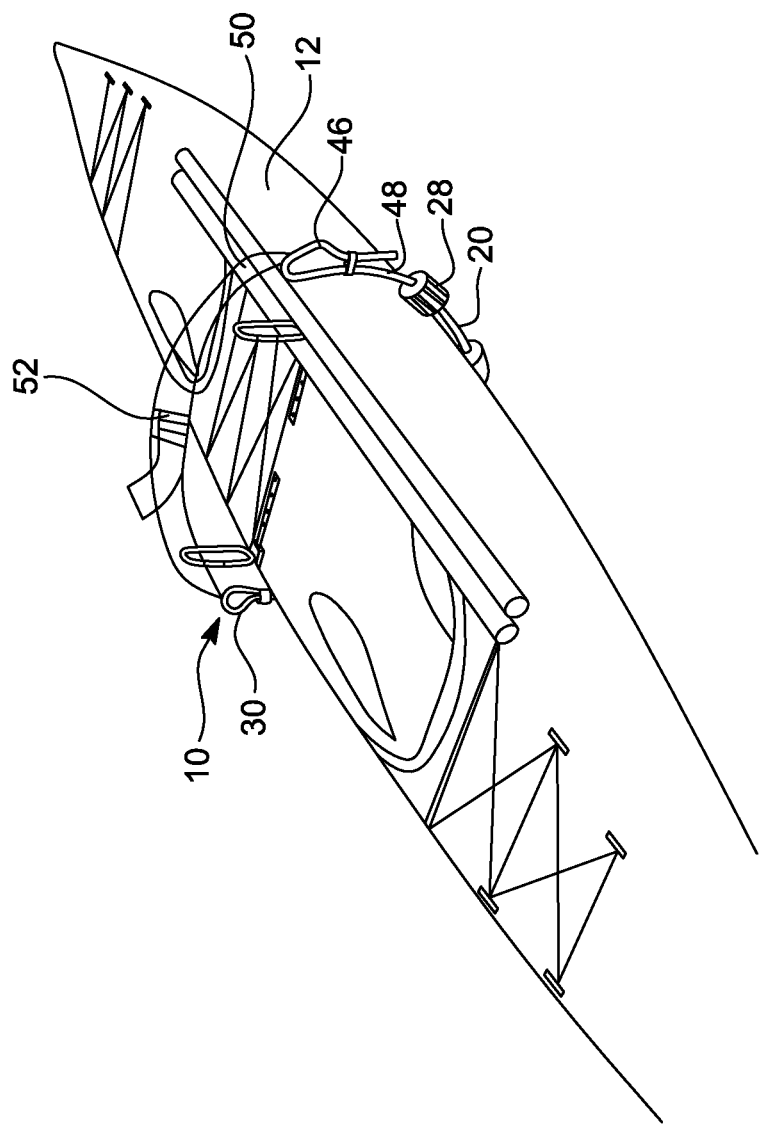
FIG. 1 is a perspective view of the apparatus of the invention positioned on a watercraft.
Figure 4:
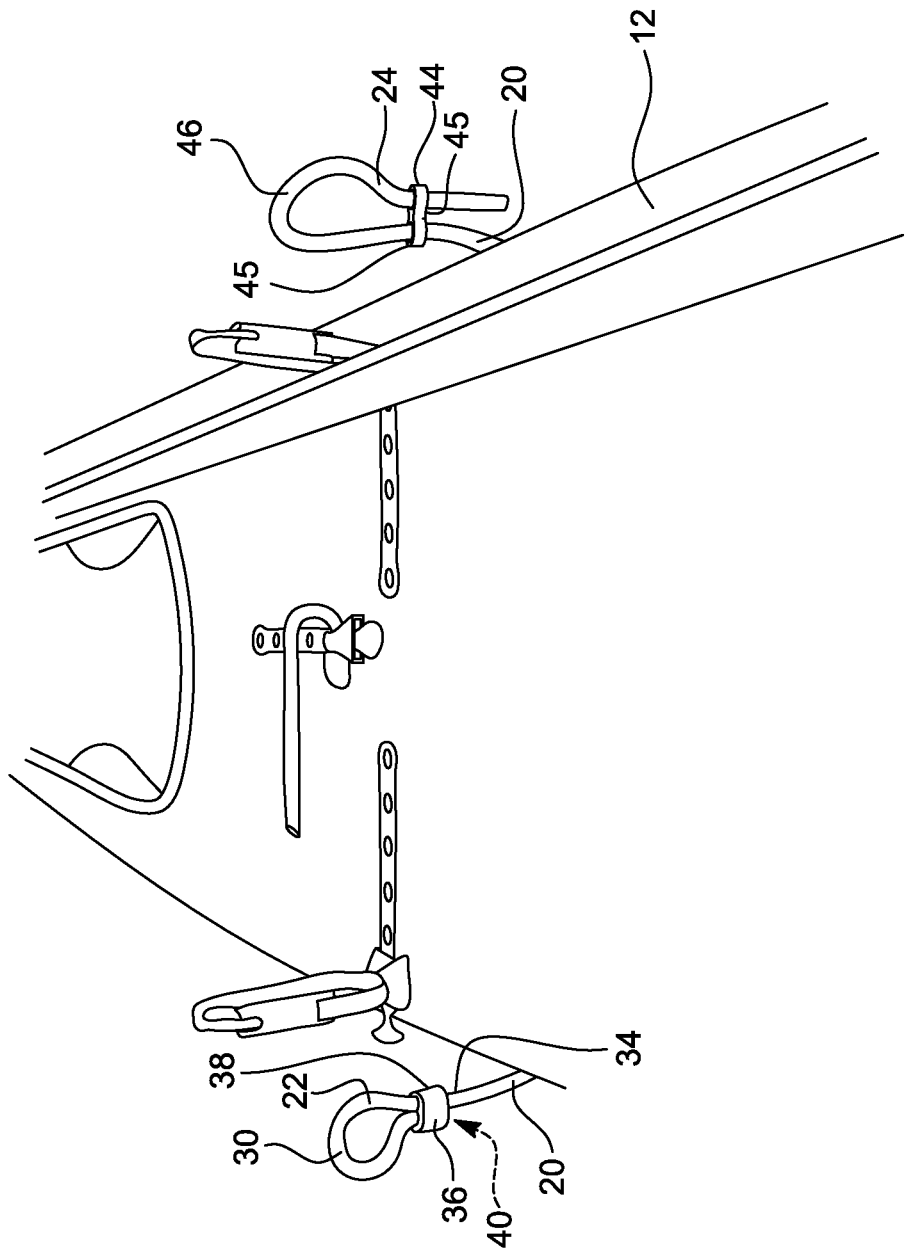
FIG. 4 is another perspective view of the apparatus of the invention positioned on a watercraft.

Referring now to FIGS. 1-4, the inventive apparatus, generally indicated by the numeral 10, is shown. The apparatus 10 is designed to provide additional hydrodynamic drag to provide additional resistance to rowers or paddlers in a watercraft 12. The apparatus 10 is thus a training aid in that the increased resistance slows the user down, causing her to focus on form and rhythm. Both the amount of drag and the size of the apparatus 10 can be adjusted as described below.

It can be seen that the apparatus 10 is formed from a single cord 20 having opposing end portions 22, 24. A number of flow resistance members 28 are removably attachable to the cord 20 in spaced relation. The number, shape, spacing, and surface features of the resistance members 28 will all factor into the amount of drag created. The cord 20 is preferably elasticated, and may be a bungee cord or equivalent. The first end portion 22 of the cord is looped, and the size of the loop 30 is non-adjustable. A dual sleeve collar 34 formed of high friction material such as rubber is positioned at the end portion 22 of the cord to form the loop 30. The interior dimensions of each sleeve 36, 38 are sized to capture a portion of the cord 20. Sleeve 36 captures the tip 40 of the end portion 22 so that no excess cord 20 protrudes from the sleeve 36. The opposing sleeve 38 is positioned on the cord 20 to form the loop 30. Both sleeves 36, 38 are sized for frictional fit about the cord 20 so that there is no relative movement between cord 20 and collar 34 so that the size of the loop 30 remains constant.

The opposing end portion 24 of the cord 20 is formed into an adjustable loop. A loop forming collar 44 having spaced apertures 45 is used to form the loop 46. The end portion 24 forms the loop 46 which can be varied in size by pulling the cord 20 through apertures 45 until a desired loop size is achieved.

The apparatus 10 forms a loop 48 about the watercraft 12 by way of an adjustable strap 50 with a buckle 52 configured in the well known manner to adjust the length of strap 50. The strap 50 is connected between loops 30 and 46 to adjust the spacing of loops 30 and 46, with the overall length of the loop 48 being a factor of strap 50 length and loop 46 size allowing for considerable length adjustment to accommodate watercraft 12 in a wide range of sizes.

Flow resistance members 28 are formed of a rubber material which may be natural or synthetic rubber. Natural rubber is preferred due to environmental issues. The members 28 may be hollow or porous to allow for flotation so that the apparatus 10 can be found on the water if accidently detached. In accordance with one aspect of the invention, the apparatus is provided with at least two different sets of resistance members 28 having differing surface patterns as described below. In order to reduce damage to the watercraft 12 from members 28, the members may include a flattened surface portion 58 which is positioned to abut the underside of the watercraft 12. Resistance members 28 have an annular bore 60 through which cord 20 is threaded. While the cord 20 is slidable within bore 60 it cannot rotate because of friction so that flattened surface portion 58 is always facing upward. Thus the flattened surface portion 58 will always impact the boat even if resistance members 28 are in spaced relation relative to the hull of the watercraft 11, as is often the case. Resistance members 28 are preferably positioned symmetrically to avoid uneven flow disruption which can actually steer the watercraft 12. Accordingly if, for example, 3 resistance members 28 are used, one is center positioned and the other two are equidistantly spaced to left and right respectively as seen in FIG. 2. Once positioned, members 28 can be locked into place using, e.g., locking O-rings or other means as would be apparent to one of skill in the art. As can be seen in FIG. 3, surface features of resistance members 28 can vary depending upon the desired drag. Generally, flow is disrupted more effectively by resistance members having more surface irregularities. Thus, the user may select from sets of resistance members 28 having varying surface irregularities to adjust the drag. Additional flow resistance can also be obtained by increasing the circumference of loop 48 in the manner described above, as the additional circumference puts more material in the water to produce more drag.

In use, the user can adjust the overall length or circumference of the apparatus 10 using strap 50 and loop 46 as discussed above. The amount of drag created by the apparatus 10 is adjusted by the number, spacing, and types of resistance members 28 used, as well as the overall circumference of the apparatus 10. The user then places the apparatus 10 about the watercraft 12.

We claim:

1. An apparatus for increasing hydrodynamic flow resistance of a watercraft comprising:
   a length of cord having opposing looped ends;
   an adjustable strap releasably connected between said looped ends to produce a loop of adjustable circumference for positioning about said watercraft;
   at least one or more resistance members positioned along said length of cord,
      wherein said resistance members are attached in non-rotational relation to said cord;
   whereby hydrodynamic flow resistance is adjusted by positioning more or fewer resistance members on said cord.

2. The apparatus of claim 1 wherein said resistance members have a generally cylindrical shape with a flattened portion.

3. The apparatus of claim 1 wherein said resistance members have surface irregularities.

4. The apparatus of claim 1 wherein said adjustable loop is adjusted to control hydrodynamic flow resistance.

* * * * *